United States Patent [19]

Liu

[11] Patent Number: 5,454,491
[45] Date of Patent: Oct. 3, 1995

[54] NON-METALLIC PRECISION FLUID TRANSFER DEVICES

[75] Inventor: Su Y. Liu, Sarasota, Fla.

[73] Assignee: World Precision Instruments, Inc., Sarasota, Fla.

[21] Appl. No.: 113,845

[22] Filed: Aug. 30, 1993

[51] Int. Cl.⁶ ..................................................... B67D 5/38
[52] U.S. Cl. ........................................... 222/158; 222/386
[58] Field of Search ...................................... 222/158, 386

[56] References Cited

U.S. PATENT DOCUMENTS

| | | | |
|---|---|---|---|
| 3,153,496 | 10/1964 | Johnson | 222/158 |
| 3,720,354 | 3/1973 | Drummond et al. | 222/386 |
| 3,923,207 | 12/1975 | Kyogoku | 222/386 |
| 4,662,545 | 5/1987 | Kenney | 222/386 |
| 4,952,209 | 8/1990 | Muhlbauer | 222/386 X |
| 5,052,588 | 10/1991 | Schlosser | 222/386 X |
| 5,253,942 | 10/1993 | Stokes | 222/386 X |

Primary Examiner—Andres Kashnikow
Assistant Examiner—Joseph A. Kaufman
Attorney, Agent, or Firm—Chilton, Alix & Van Kirk

[57] ABSTRACT

A device for delivering precisely measured, minute quantities of liquid has no metal parts which contact the liquid. The device employs a barrel defining member with a bore which receives a polymer coated glass or ceramic fiber which functions as a piston. Fluid is drawn into and discharged from the bore via a needle in the form of a polymer coated glass or ceramic capillary tube.

2 Claims, 2 Drawing Sheets

NON-METALLIC PRECISION FLUID TRANSFER DEVICES

BACKGROUND OF THE INVENTION

1. Field of the Invention

The present invention relates to the measurement of and/or dispensing of minute quantities of liquids. More specifically this invention is directed to a transfer device for measurement and dispensing of fluids and particularly to a non-metallic transfer device for precision measurement and dispensing of less than 1 milliliter of a liquid. Accordingly, the general objects of the invention are to provide novel and improved methods and apparatus of such character.

2. Description of the Prior Art

Virtually all hypodermic needles presently manufactured have some metallic components within their structure. Thus, metal can be in some or all of the pistons, ferrules, needles and other syringe components. Metal is used in these circumstances for its strength. These metallic components can in some circumstances react with the fluid being dispensed, resulting in contamination of the measured fluid. For example, when titrating an acid, the acid can corrode the metal components of the syringe, resulting in contamination of the acid and possible failure of the syringe to properly operate. Friction within the syringe can also result in metal components wearing and contaminating fluids with metal particles. While these contamination problems could be avoided through the use of glass or a similar non-reactive material for all the components of a syringe, it has been widely known and accepted that the fragility of glass precluded its use as, for example, a small diameter piston. Accordingly, in the prior art, it has been exceedingly difficult to successfully measure and transfer small quantities of liquid without risk of metal contamination.

SUMMARY OF THE INVENTION

The present invention is directed to the manufacture of syringes and similar precision fluid transfer devices without metal components, in particular very small volume syringes that measure and dispense fluids in the microliter to tens of microliter volume ranges. In the present invention, the syringe piston is manufactured in the same manner as optical fibers. The art of manufacturing modern fiber optics has taught that when glass, fused silica, or quartz are drawn from a molten state and clad with a suitable polymer, the resulting clad fiber is much stronger than similar unclad fibers and can tolerate large bending and compressive forces without fracture. The fiber optic manufacturing process can be applied to both solid rods or hollow tubes of glass, fused silica, or quartz. The present invention uses a solid rod as a piston, and a hollow tube as a needle, the rod and tube being combined with a non-metallic syringe body to produce a high precision, small volume, non-metallic syringe.

In the preferred embodiment, a hollow tube of glass or a ceramic, fused silica or quartz for example, clad with a polymer is fused or cemented onto the end of a non-metallic syringe body. A solid rod piston of glass, fused silica, or quartz clad with a polymer slides in a bore of the syringe body or barrel. A cap on the end of the piston aids in the transfer of force to cause the piston to move along the bore.

Both the syringe pistons and syringe needles of the invention are produced by drawing a fiber from molten glass, fused silica or quartz. The fiber is coated with a polymer immediately after the fiber has cooled. Suitable coatings include polyimide, chlorinated ethylene proplylene (FEP), and polytetrafluroethylene (PTFE), acrylate, and silicone. A piston made by such a method will typically be less than a millimeter in diameter but yet will still be sufficiently rigid, strong and, in addition, will be relatively unbreakable.

BRIEF DESCRIPTION OF THE DRAWINGS

The present invention may be better understood and its numerous objects and advantages will become obvious to those skilled in the art by reference to the description below in combination with the accompanying drawings, wherein like reference numerals refer to like elements in the several figures, and in which.

DESCRIPTION OF THE PREFERRED EMBODIMENT

Figure 1:
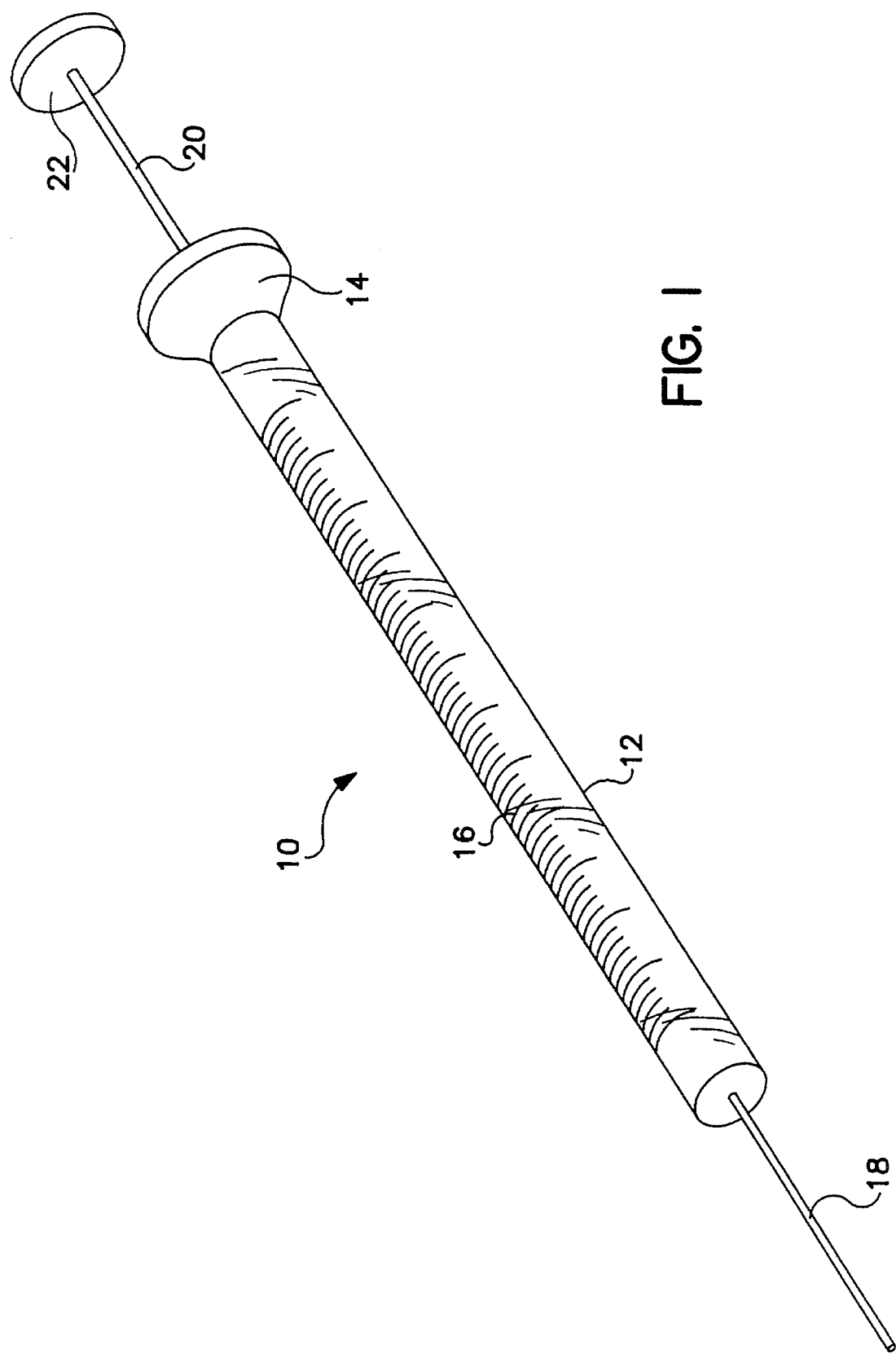
FIG. 1 is a perspective view of a non-metallic syringe in accordance with the invention.

FIG. 1 shows a non-metallic syringe 10 comprising a barrel 12. The barrel 12 is made from plastic, glass, silica, quartz or some other transparent, non-metallic substance of sufficient strength and non-reactivity. A skirt 14 is provided at a first end of barrel 12 to facilitate operation of the syringe. A bore, indicated at 24 in FIG. 2, runs the length of the barrel 12 and through the skirt 14. The diameter of bore 24 will typically be in the range from 0.2 mm to 0.6 mm. Gradation markings 16 are provided on barrel 12 to allow precise measurement of the fluid drawn into or expelled from the syringe 10.

A small diameter conduit, which functions as a needle 18, is affixed to the end of the barrel 12 disposed opposite to the skirt 14. The needle 18 is a hollow tube of glass, fused silica, or quartz which is coated with a polymer. The usable inner and outer diameters of needle 18 are respectivly in the range of 0.075 mm to 0.7 mm and in the range of 0.15 to 1.0 mm. Suitable polymers that may be employed in coating needle 18 include polyimide, FEP, PTFE, acrylate or silicone. The needle is fused or cemented to the barrel 12 so that the axial passage through the needle 18 is aligned with the bore 24 in barrel 12.

A piston 20 slides in the bore 24 of barrel 12. Piston 20 is a coated glass or ceramic "rod" and preferably comprises a polymer coated optical type fiber formed from glass, fused silica, or quartz. The coating on piston 20 may be selected from those usable to coat needle 18. The general characteristics of a suitable coating are good adhesion to glass or ceramics and low friction. The diameter of piston 20 is slightly smaller than that of the bore in barrel 12 so as to allow a sliding fit. A cap 22 is fused or cemented to the end of piston 20 to aid in moving the piston 20 in the bore of barrel 12.

Figure 2:
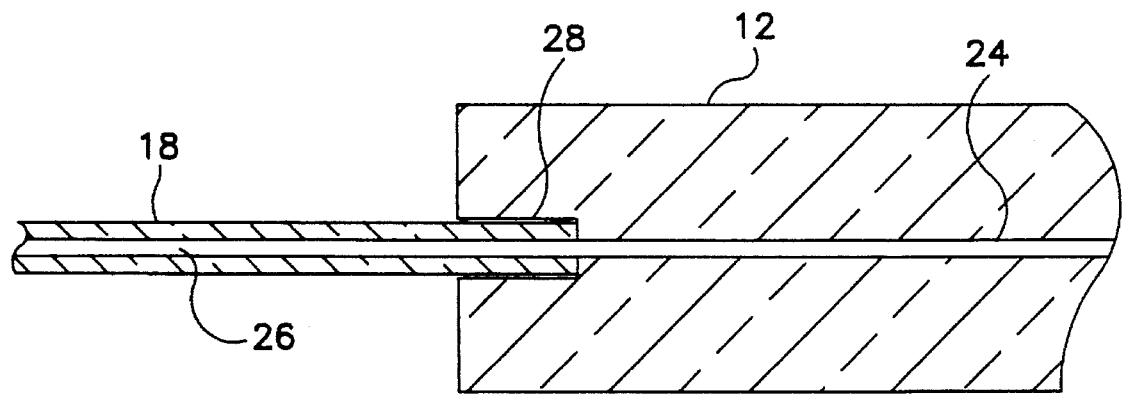
FIG. 2 is a partial cross-section view of the syringe of FIG. 1, FIG. 2 showing the needle to syringe body connection.

FIG. 2 is a sectional view of the coupling between needle 18 and barrel 12. The axial bore 24 in barrel 12 is aligned with passage 26 in needle 18. In the preferred embodiment the bore 24 and passage 26 are of equal diameter and directly aligned along the same axis for ease of fluid flow. However, the passage 26 and bore 24 need not be of equal diameter, and would not be so when the capacity of the syringe to hold fluids needs to be increased without a corresponding increase of the diameter of needle 18. Needle 18 is received in an enlarged diameter end portion 28 of bore 24 of barrel 12. The end portion 28 of bore 24 provides sufficient surface contact with the outside of needle 18 to allow cementing or fusing of needle 18 to barrel 12.

Figure 3:
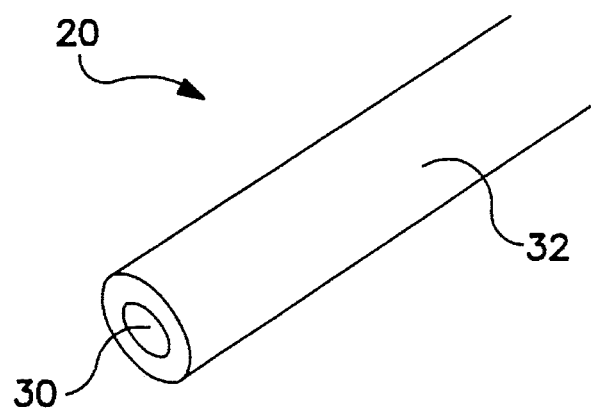
FIG. 3 is an end view of the piston of the syringe of FIG. 1.

FIG. 3 is an end view of piston 20. The piston 20 comprises a center core 30 or rod of glass, fused silica, or quartz coated with a polymer 32. The polymer coating 32 can, as noted above, be comprised of polyimide, FEP, PTFE, acrylate, silicone or other polymer used in the art of fiber optic coating.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A fluid transfer device comprising:

barrel means having a small diameter bore and a pair of oppositely disposed ends, said bore having a constant diameter which extends linearly between said ends, said barrel means being comprised of a transparent, non-metallic material and being provided with graduation markings in registration with said bore;

conduit means extending from a first end of said barrel means for forming an extension of said bore, said conduit means being comprised of a material selected from the group consisting of glass, fused silica and quartz, said conduit means having an external polymer coating;

a piston slidably received in said barrel means bore, said piston comprising a rod-shaped fiber having a longitudinal axis, said fiber being selected from the group consisting of glass and ceramic, said piston being provided with a polymer coating selected from the group consisting of polymides, FEP, PTFE, acrylate and silicone, said piston extending into said bore from the second end of said barrel means; and means for facilitating the application of axial force to said piston to impart linear motion thereto whereby said piston will move in said bore relative to said conduit means.

2. The fluid transfer device of claim 1 wherein:

said conduit means has an inner diameter in the range of 0.075 mm to 0.7 mm and an outer diameter in the range of 0.15 mm to 1.0 mm.

* * * * *